United States Patent
Zhang

(10) Patent No.: US 6,894,720 B2
(45) Date of Patent: May 17, 2005

(54) METHOD AND APPARATUS FOR APPLYING TONE MAPPING FUNCTIONS TO COLOR IMAGES

(75) Inventor: Xuemei Zhang, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 284 days.

(21) Appl. No.: 09/945,094

(22) Filed: Aug. 30, 2001

(65) Prior Publication Data

US 2004/0218072 A1 Nov. 4, 2004

(51) Int. Cl.[7] .............. H04N 5/228; H04N 9/68; H04N 3/14; G03F 3/08; G06K 9/00
(52) U.S. Cl. .............. 348/222.1; 348/234; 348/273; 382/167; 358/520
(58) Field of Search ............... 382/167, 274, 382/162–169; 348/222.1, 266, 273, 234, 223.1, 241, 645, 172, 173; 358/463, 520

(56) References Cited

U.S. PATENT DOCUMENTS

| | | | | |
|---|---|---|---|---|
| 4,021,843 A | * | 5/1977 | Taniguchi et al. .......... 348/656 |
| 4,812,903 A | * | 3/1989 | Wagensonner et al. ...... 348/645 |
| 5,233,684 A | * | 8/1993 | Ulichney .................... 345/604 |
| 5,557,429 A | * | 9/1996 | Hirose ....................... 358/532 |
| 5,633,511 A | * | 5/1997 | Lee et al. ................... 382/132 |
| 5,638,138 A | * | 6/1997 | Hickman .................... 348/712 |
| 6,040,876 A | * | 3/2000 | Pettitt et al. ................ 348/627 |
| 6,101,271 A |   | 8/2000 | Yamashita |
| 6,393,148 B1 | * | 5/2002 | Bhaskar ..................... 382/169 |
| 6,408,103 B1 | * | 6/2002 | Gallagher et al. .......... 382/167 |
| 6,438,264 B1 | * | 8/2002 | Gallagher et al. .......... 382/167 |
| 6,594,388 B1 | * | 7/2003 | Gindele et al. ............. 382/187 |
| 2003/0012414 A1 | * | 1/2003 | Luo .......................... 382/274 |

* cited by examiner

Primary Examiner—Andrew Christensen
Assistant Examiner—Nhan T. Tran

(57) ABSTRACT

A pixel of a digital image is processed by applying a tone mapping function to a first color channel of the pixel, whereby a value of the first color channel is changed by a scale factor; and applying the scale factor to all other color channels of the pixel. The first color channel most closely matches relative luminance response of the human visual system.

21 Claims, 1 Drawing Sheet

METHOD AND APPARATUS FOR APPLYING TONE MAPPING FUNCTIONS TO COLOR IMAGES

BACKGROUND

A digital image may be represented in an output-device space, such as display RGB, or in a capture-device space, such as camera RGB, or in a device-independent space, such as CIE tristimulus space XYZ. The relative luminance values of all pixels in the image determine the tone properties of the image.

Tone mapping is performed to bring the overall brightness of a digitally captured image to a level that is pleasing to the human eye when the image is displayed. This is especially important for images that are under-exposed or over-exposed. Tone mapping is frequently performed with a "tone curve" that maps the original digital levels to new ones. The same tone curve is applied to all color channels independently. The tone mapping is simple and fast, and it does not introduce out-of-gamut colors. However, applying tone mapping curves to different color channels independently can introduce color distortions for some images since the values of different color channels are remapped to new values independently of each other. As a result, the chromaticity of individual pixels can change.

Accordingly, there is a need to improve image tone properties without changing the chromaticity of the pixels.

SUMMARY

A pixel of a digital image is processed by applying a tone mapping function to a first color channel of the pixel, whereby a value of the first color channel is changed by a scale factor; and applying the scale factor to all other color channels of the pixel. The first color channel most closely matches relative luminance response of the human visual system.

Other aspects and advantages of the present invention will become apparent from the following detailed description, taken in conjunction with the accompanying drawings, illustrating by way of example the principles of the invention.

DETAILED DESCRIPTION

Figure 1:
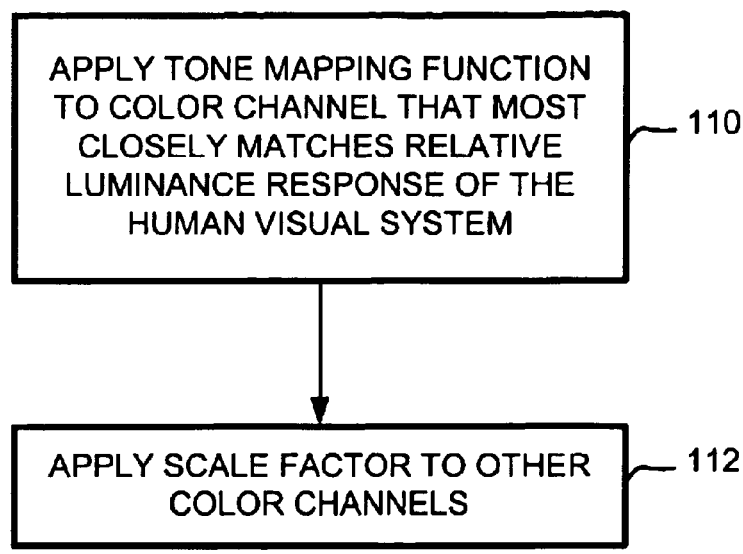
FIG. 1 is an illustration of a method of applying tone mapping functions to color images.

Referring to FIG. 1, a method of processing a pixel of a digital image includes applying a tone mapping function to a first color channel of the pixel (110), whereby a value of the first color channel is changed by a scale factor; and applying the scale factor to all other color channels of the pixel (112). The first color channel most closely matches relative luminance response of the human visual system.

The digital image is represented in a linear color space having n-channels that may be designated by $A_L$ and $A_k$ where k=1, 2, . . . , n-1. $A_L$ represents the channel most closely matching a luminance function in the color space, and $A_k$ represents the other n-1 channels of the color space.

The method of FIG. 1 may be represented mathematically as follows:

$$A_L'=TM(A_L); \text{ and}$$

$$A_k'=SF(A_k) \text{ for } k=1, 2, \ldots, n-1$$

where TM(·) is a tone mapping function, $A_L'$ and $A_k'$ are the modified values of the color channels, and scale factor $SF=A_L'/A_L$. The pixels are processed independently. A scale factor is determined for one color channel of a pixel, and applied to each other color channel of that pixel. Any tone mapping function may be used.

When the overall tone properties of the digital image are changed by the tone mapping function, the chromacity of pixels in the image does not change (unlike conventional tone mapping techniques that apply tone-mapping functions to different color channels independently). The method of FIG. 1 keeps the chromaticity, or the vector orientation in the $A_k$ color space, or the spectrum shape of each pixel's color approximately the same after the tone mapping; only the vector length in $A_k$ space (or the scale factor of the spectrum) is changed.

Since almost all images have some degree of noise present, noise-balancing terms may be added to each channel to prevent noise amplification. The noise balancing terms are small positive numbers that are a function of the amount of noise in the image or the white point of the color space used to represent the image. For example, the noise terms may be set to the noise level, twice the noise level, or some other value. As long as the noise balancing terms are reasonably close to the noise level in the image, the method is not sensitive to variations in how the noise level is determined.

The noise balancing terms may be added as follows. For each pixel, a tone-mapping function is applied to the value of the $A_L$ channel, and the values of the color channels are adjusted as follows:

$$A_L'=TM(A_L); \text{ and}$$

$$A_k'=(A_k+A_{k(noise)})/(A_L+A_{L(noise)}) \times A_L'.$$

The addition of the noise balancing terms has very little influence on the chromaticities of high-luminance pixels, but helps reduce the noise amplification problem on low-luminance pixels. The noise balancing terms are also helpful in avoiding division by zero when a zero luminance value is mapped to a non-zero value on the tone curve.

The method of FIG. 1 is applied to an image represented in positive linear color space. Examples of linear positive color space include the CIE tristimulus XYZ space, RGB space, and human cone sensitivity space. The positive linear color space may include any number of color channels.

Consider the CIE tristimulus XYZ component representation of a digitized color image. The CIE Y value of an image pixel represents its relative luminance level. For each pixel, a tone mapping function is applied to the Y value and the X and Z values of are adjusted as follows:

$$Y'=TM(Y);$$

$$X'=(X+X_{noise})/(Y+Y_{noise}) \times Y'; \text{ and}$$

$$Z'=(Z+Z_{noise})/(Y+Y_{noise}) \times Y'.$$

The terms $X_{noise}$, $Y_{noise}$, and $Z_{noise}$ are the noise-balancing terms and they may be small positive values representing the noise levels in each color channel or they may be a triplet of numbers proportional to the white point of the color space used to represent the image.

In RGB color space, the Green channel is usually the channel that most closely matches the relative luminance response of the human visual system. Therefore, a tone-mapping function is usually applied to the Green channel, and the Red and Blue values are adjusted similarly to keep the color vector orientation constant in the RGB space. Whether the Green channel is tone mapped first depends upon the particular type of color space. In certain instances, either the Red or Blue channel may be tone mapped first instead of the Green channel.

Figure 2:
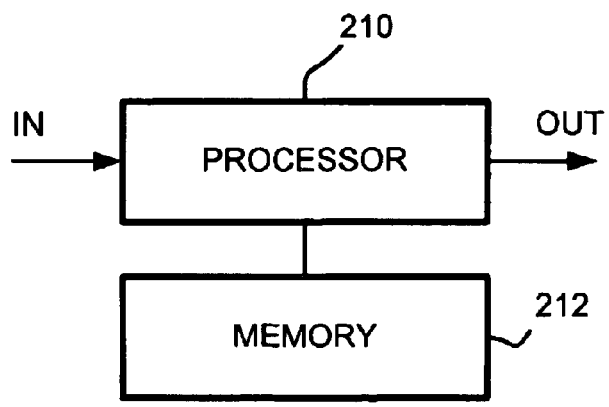
FIG. 2 is an illustration of a processor for applying tone mapping functions to color images.

Reference is made to FIG. 2, which shows a processor 210 that is programmed to tone map a color image (IN). The processor 210 applies a tone mapping function to the color channel most closely matching relative luminance response of the human visual system; and applies scale factors to all other color channels. The pixels in the output image (OUT) retain their chromacity. The processor 210 may be used in applications such as digital cameras, scanners, printers, displays, and image processing software applications. Software for the processor 210 is encoded in computer memory 212.

The present invention is not limited to the embodiments just described and illustrated. Instead, the present invention is construed according to the claims the follow.

What is claimed is:

1. A method of processing a pixel of a digital image, the method comprising:

applying a tone mapping function to a first color channel of the pixel, the first color channel most closely matching relative luminance response of the human visual system;

computing scale factors for other channels of the pixel, the scale factors computed according to fixed offset values and values of the first color channel before and after the tone mapping function is applied, the fixed values offsetting the effect of noise in calculating the scale factors; and applying the scale factors to the other color channels of the pixel.

2. The method of claim 1, wherein the color channels correspond to a positive linear color space.

3. The method of claim 1, wherein the fixed values are a triplet of numbers proportional to a white point of a color space of the channels.

4. The method of claim 1, wherein the first color channel is denoted by $A_L$ and the other channels are denoted by $A_k$; and wherein the $A_k$ color channels are transformed according to $A'_k=(A_k+A_{k(noise)})/(A_L+A_{L(noise)})\times A'_L$, where the fixed values are denoted by $A_{k(noise)}$ and $A_{L(noise)}$ and are small positive numbers.

5. The method of claim 1, wherein the color channels are CIE tristimulus channels XYZ, wherein noise balancing terms $X_{noise}$, $Y_{noise}$, $Z_{noise}$ are added to the color space and wherein the channels of the color space are modified as follows:

$Y'=TM(Y)$;

$X'=(X+X_{noise})/(Y+Y_{noise})\times Y'$; and $Z'=(Z+Z_{noise})/(Y+Y_{noise})\times Y'$.

6. The method of claim 5, wherein the fixed values are a triplet of numbers proportional to the write point of the CIE tristimulus channels.

7. The method of claim 1, wherein the channels are RGB color channels, wherein the channels are modified as follows:

applying a tone mapping function to the G channel of each pixel to generate a tone-corrected relative luminance value G' for each pixel;

transforming the R value of each pixel according to $R'=(R+R_{noise})/(G+G_{noise})\times G'$; and transforming the B value of each pixel according to $B'=(B+B_{noise})/(G+G_{noise})\times G'$, where $R_{noise}$, $G_{noise}$, $B_{noise}$ are the fixed values.

8. The method of claim 7, wherein the fixed values are a triplet of numbers proportional to the white point of the RGB color channels.

9. Apparatus for processing pixels of a digital image, the apparatus comprising a processor for applying a tone mapping function to a first color channel of the pixels, computing scale factors for other channels of the pixels, and applying the scale factors to the other color channels of the pixels; wherein the scale factors are computed according to noise balancing terms and changed in values of the first color channel, and wherein the first color channel most closely matches relative luminance response of the human visual system.

10. The apparatus of claim 9, wherein the pixels are processed independently, whereby a scale factor is specific to each pixel.

11. The apparatus of claim 9, wherein the scale factors are computed and applied as $A'_k=(A_k=A_{k(noise)})/(A_L=A_{L(noise)})\times A'_L$, where $A_{k(noise)}$ and $A_{L(noise)}$ are small positive numbers representing the noise balancing terms, $A_L$ represents the first color channel, and $A_k$ represents one of the other color channels.

12. The apparatus of claim 9, wherein the noise balancing terms are a triplet of numbers proportional to a color space white point.

13. The apparatus of claim 9, wherein the noise balancing terms are the same for all pixels in the image.

14. The apparatus of claim 9, wherein the color channels are CIE tristimulus channels XYZ, and wherein the color channels are modified as follows:

$Y'=TM(Y)$;

$X'=(X+X_{noise})/(Y+Y_{noise})\times Y'$; and $Z'=(Z+Z_{noise})/(Y+Y_{noise})\times Y'$.

15. The apparatus of claim 9, wherein the color channels are RGB color channels, and wherein the channels are modified as follows:

applying a tone mapping function to the G channel of each pixel to generate a tone-corrected relative luminance value G' for each pixel;

transforming the R value of each pixel according to $R'=(R+R_{noise})/(G+G_{noise})\times G'$; and transforming the B value of each pixel according to $B'=(B+B_{noise})/(G+G_{noise})\times G'$, where $R_{noise}$, $G_{noise}$, $B_{noise}$ are the noise balancing terms.

16. An article for a processor, the article comprising memory encoded with data for instructing the processor to process pixels of a color digital image, the processing including applying a tone mapping function to a first color channel of the pixels, and computing scale factors for other channels of the pixels, the scale factors computed according to noise balancing terms and values of the first color channel before and after applying the function, the processing further including applying the scale factors to the other color channels of the pixels; wherein the first color channel most closely matches relative luminance response of the human visual system.

17. The article of claim 16, wherein the scale factors are computed and applied as $A'_k=(A_k+A_{k(noise)})/(A_L+A_{L(noise)})\times A'_L$, where $A_{k(noise)}$ and $A_{L(noise)}$ are small positive numbers representing the noise balancing terms, $A_L$ represents the first color channel, and $A_k$ represents one of the other color channels.

18. The article of claim 16, wherein the noise balancing terms are a triplet of numbers proportional to a color space white point.

19. The article of claim 16, wherein the noise balancing terms are the same for all pixels in the image.

20. The article of claim 16, wherein the color channels are CIE tristimulus channels XYZ, and wherein the color channels are modified as follows:

$Y'=TM(Y)$;

$X'=(X+X_{noise})/(Y+Y_{noise}) \times Y'$; and $Z'=(Z+Z_{noise})/(Y+Y_{noise}) \times Y'$.

21. The article of claim 16, wherein the color channels are RGB color channels, and wherein the channels are modified as follows:

applying a tone mapping function to the G channel of each pixel to generate a tone-corrected relative luminance value G' for each pixel;

transforming the R value of each pixel according to $R'=(R+R_{noise})/(G+G_{noise}) \times G'$; and transforming the B value of each pixel according to $B'=(B+B_{noise})/(G+G_{noise}) \times G'$, where $R_{noise}$, $G_{noise}$, $B_{noise}$ are the noise balancing terms.

* * * * *